United States Patent
Lenon et al.

(10) Patent No.: US 8,308,176 B2
(45) Date of Patent: Nov. 13, 2012

(54) SUSPENSION STOP COMPRISING A MOBILE SEALING ELEMENT

(75) Inventors: Herve Lenon, Gruffy (FR); Gerard Mermoud, La Balme de Sillingy (FR); Ludovic Saunier, Saint Felix (FR)

(73) Assignee: SNR Roulements, Annecy (FR)

( * ) Notice: Subject to any disclaimer, the term of this patent is extended or adjusted under 35 U.S.C. 154(b) by 111 days.

(21) Appl. No.: 12/665,749

(22) PCT Filed: Jun. 27, 2008

(86) PCT No.: PCT/FR2008/000923
§ 371 (c)(1),
(2), (4) Date: Aug. 5, 2010

(87) PCT Pub. No.: WO2009/019340
PCT Pub. Date: Feb. 12, 2009

(65) Prior Publication Data
US 2010/0308555 A1    Dec. 9, 2010

(30) Foreign Application Priority Data

Jun. 29, 2007 (FR) .................................. 07 04723

(51) Int. Cl.
*B60G 15/00* (2006.01)
*F16C 19/02* (2006.01)

(52) U.S. Cl. ............... 280/124.147; 384/607; 384/609; 280/124.155; 267/220

(58) Field of Classification Search ........... 280/124.147, 280/124.155; 267/219, 220, 292, 293; 384/477, 384/484, 607, 609
See application file for complete search history.

(56) References Cited

U.S. PATENT DOCUMENTS

| | | | |
|---|---|---|---|
| 1,895,167 A | | 1/1933 | Lighthall |
| 4,497,523 A | * | 2/1985 | Lederman ................ 384/615 |
| 4,566,812 A | * | 1/1986 | Takei et al. .............. 384/484 |
| 4,925,323 A | * | 5/1990 | Lederman ................ 384/607 |
| 4,948,272 A | * | 8/1990 | Stowe ...................... 384/607 |
| 4,995,737 A | * | 2/1991 | Moller et al. ............ 384/607 |
| 5,439,298 A | | 8/1995 | Zernickel et al. |
| 6,267,512 B1 | * | 7/2001 | Beghini et al. .......... 384/609 |
| 6,296,396 B1 | | 10/2001 | Schwarzbich |
| 6,524,013 B2 | * | 2/2003 | Beghini et al. .......... 384/602 |
| 6,558,043 B2 | * | 5/2003 | Beghini et al. .......... 384/615 |
| 6,814,496 B2 | * | 11/2004 | Beghini et al. .......... 384/617 |
| 7,681,896 B2 | * | 3/2010 | Yano .................. 280/124.155 |
| 7,922,397 B2 | * | 4/2011 | Beauprez et al. ........ 384/609 |
| 8,109,492 B2 | * | 2/2012 | Winocur .................. 267/220 |
| 2005/0247531 A1 | * | 11/2005 | Oota ................... 188/322.19 |

FOREIGN PATENT DOCUMENTS

| | | |
|---|---|---|
| EP | 1162091 A1 | 12/2001 |
| FR | 2375484 A1 | 7/1978 |

\* cited by examiner

*Primary Examiner* — Joseph Rocca
(74) *Attorney, Agent, or Firm* — Bachman & LaPointe, P.C.

(57) ABSTRACT

A suspension stop for a motor vehicle has an upper cup, a lower cup and roller bodies arranged between the cups to permit the relative rotation thereof. The cups are designed to have at least one annular space between them. The stop further has a seal element arranged in the annular space with a sliding contact with each cup. The seal element is arranged to be mobile with relation to at least one cup.

10 Claims, 5 Drawing Sheets

SUSPENSION STOP COMPRISING A MOBILE SEALING ELEMENT

BACKGROUND (1) Field of the Invention

The invention relates to a suspension stop for an automobile especially designed to be integrated into a telescopic Macpherson strut of a steering wheel of an automobile.

The invention applies to a suspension stop comprising a fixed upper cup designed to be associated to the body of the automobile, a rotating lower cup featuring a support for the suspension spring and rolling bodies positioned between said cups to permit them to rotate relatively.

(2) Prior Art

To prevent the lubricant in the bearing space from leaking and also the contamination of said space by external pollutants, the prior art discloses the use of seals comprising a flexible sealing element that is associated or integrated into one of the cups so that a friction contact is created with the other cup.

This embodiment has the particular disadvantage of inducing a friction torque during the relative rotation of the cups, which is detrimental to the use of the stop in the assembly of a steering wheel.

To overcome this problem, it has been proposed to replace the friction sealing elements by baffles formed in the free space between the cups. However, eliminating the friction contact is also detrimental to the reliability of the sealing function. Furthermore, the efforts to which the stop is subjected tend to deform the free space between the cups, which modifies the configuration of the baffles formed in a non-optimal condition as concerns the sealing.

Furthermore, due to the changes in the configuration due to the baffles and the friction contacts, the rotation torque is difficult to control in function of the deformations of the suspension stop.

SUMMARY OF THE INVENTION

The invention aims to overcome the problems of the prior art by proposing a suspension stop wherein the compromise between the sealing function and the induced torque is obtained in a particularly satisfactory manner, even in the case of deformation of the stop due to the efforts to which it is subjected.

For this purpose, the invention proposes a suspension stop for an automobile, wherein said stop comprises an upper cup, a lower cup and rolling bodies positioned between said cups to permit them to rotate relatively, wherein said cups are fitted so that they leave at least an annular space between them, wherein said stop further comprises a sealing element that is located in said space so that it is in friction contact with each of the cups, and said element is mounted so that it is mobile with respect to at least one cup.

BRIEF DESCRIPTION OF THE DRAWING(S)

Other specific features and advantages of the invention will become clearer upon reading the following description, provided in reference to the appended figures, wherein.

DETAILED DESCRIPTION OF THE PREFERRED EMBODIMENT(S)

Figure 1:
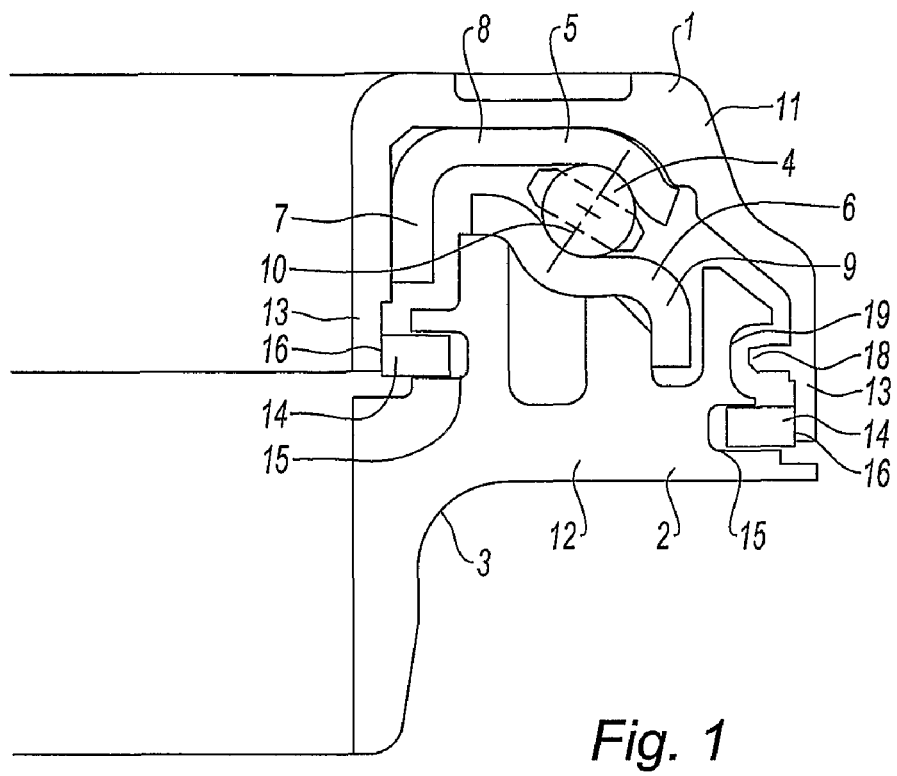
FIGS. 1 to 6 show partially and in an axial cross section a suspension stop respectively according to one embodiment of the invention.

In this description, the terms concerning the positioning in space are made in reference to the axis of rotation of the suspension stop (vertical in the figures showing one side of the cross section, wherein the other side is symmetrical with respect to said axis). In particular, the term "internal" relates to a location close to this axis and the term "external" relates to a location at a distance from this axis. Furthermore, the terms "upper" and "lower" relate to the location of the stop as shown in the figures.

A wheel of an automobile, especially a steering wheel, is mounted onto the chassis by means of a Macpherson strut which permits the body to be suspended with respect to the ground. For this purpose, the Macpherson strut usually comprises a damper, a suspension spring and a suspension stop against which the spring rests.

In relation to the figures, a description of embodiments of a suspension stop is provided below, wherein said suspension stop comprises a fixed upper cup 1 designed to be associated to the body of the vehicle, a rotating lower cup 2 featuring a support 3 for the suspension spring and rolling bodies 4 positioned between said cups to permit them to rotate relatively around an axis. Consequently, when the spring is solicited in compression and in expansion, the winding of the coils of the latter on themselves is modified, which leads to the rotation of the lower cup 2. Moreover, turning the wheels also induces a rotation of the lower cup 2.

In the embodiments shown, the upper 1 and lower 2 cups each feature a washer 5, 6, especially made of stamped sheet steel that respectively has a lower and upper bearing ring for the rolling bodies 4.

More precisely, in FIGS. 1 to 5 and 7 to 10, the upper washer 5 has an internal axial rigidifying portion 7, and a substantially radial portion 8 on the lower part of which the upper bearing ring is formed. The lower washer 6 comprises an external (FIGS. 1 to 4) or internal (FIGS. 5 and 7 to 10) axial rigidifying portion 9, and an axial-radial portion 10 on which the lower bearing ring is formed opposite the upper bearing ring so as to form a bearing track with oblique contact for the balls 4.

The suspension stop further comprises two cover parts 11, 12, especially made from a moulded rigid thermoplastic material, for example of the polyamide 6.6 type. These parts are respectively a cover 11 associated to the upper washer 5 so as to be interposed between the chassis and said upper washer, and a support 12 associated underneath the lower washer 6, wherein said support comprises the spring support 3. These cover parts 11, 12 especially permit the efforts of the spring to be borne as well as possibly those of the buffer stop.

Figure 7:
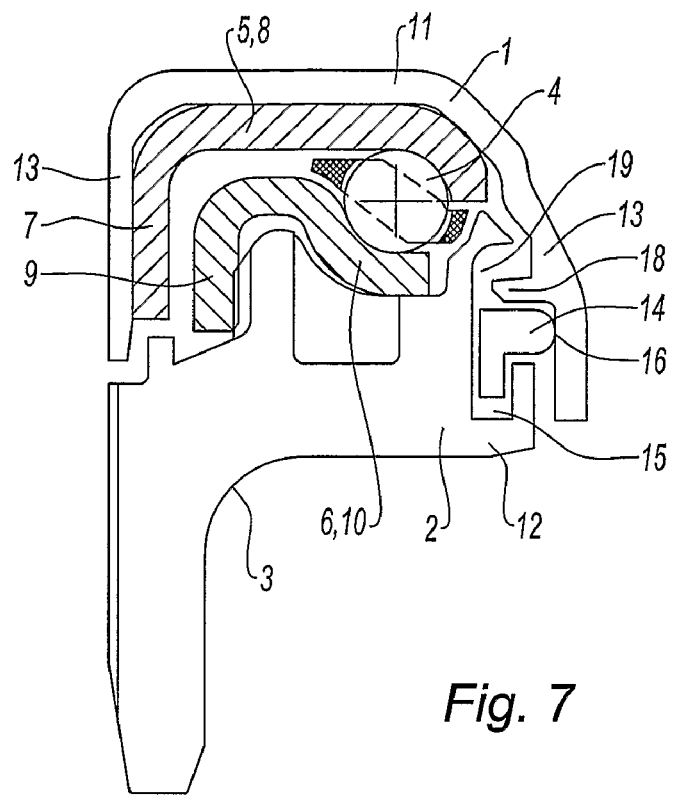
FIGS. 7 and 8 show partially and in an axial cross section a suspension stop respectively according to one embodiment of the invention.
Figure 8:
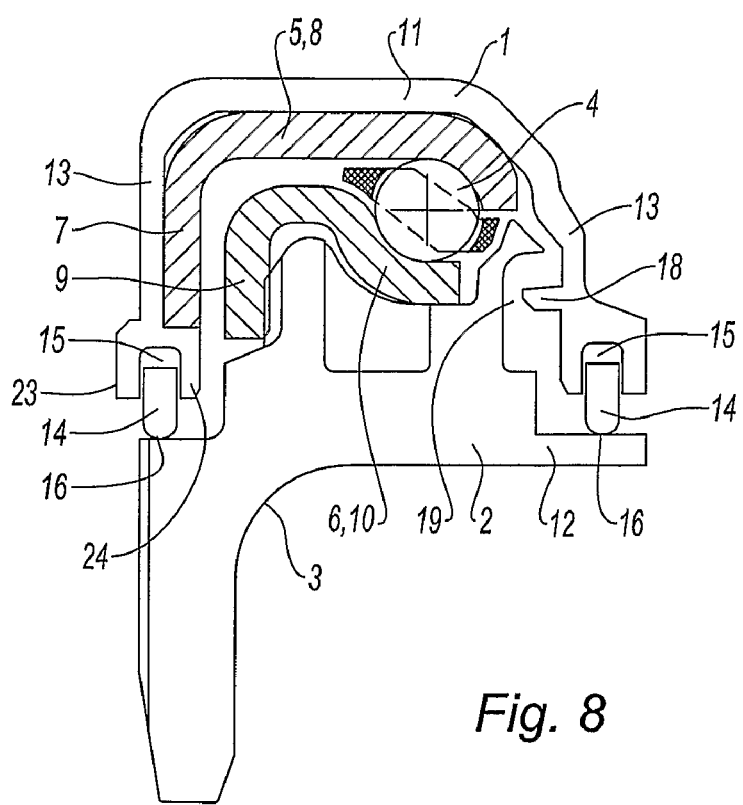
Figure 9:
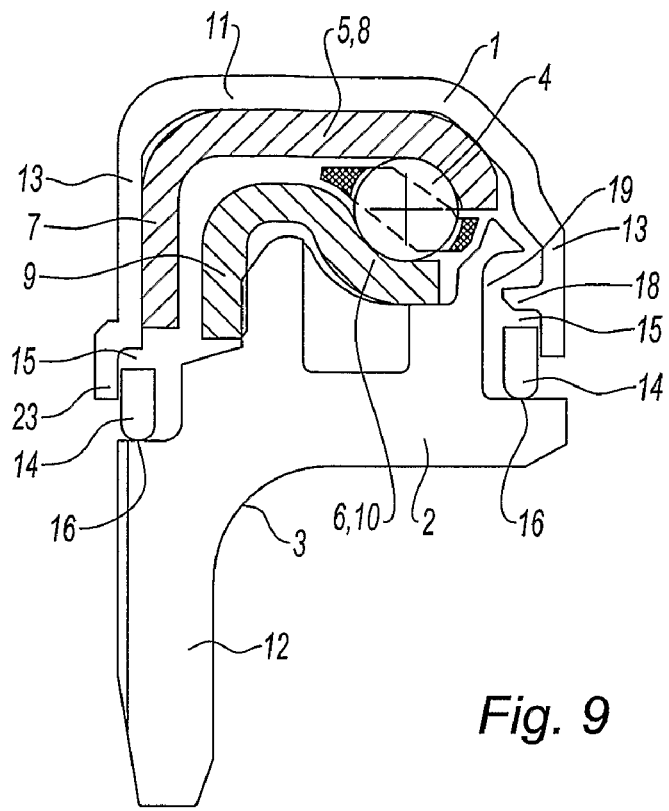
FIGS. 9 and 10 show partially and in an axial cross section a suspension stop respectively according to one variant of the embodiment of FIG. 8.
Figure 10:
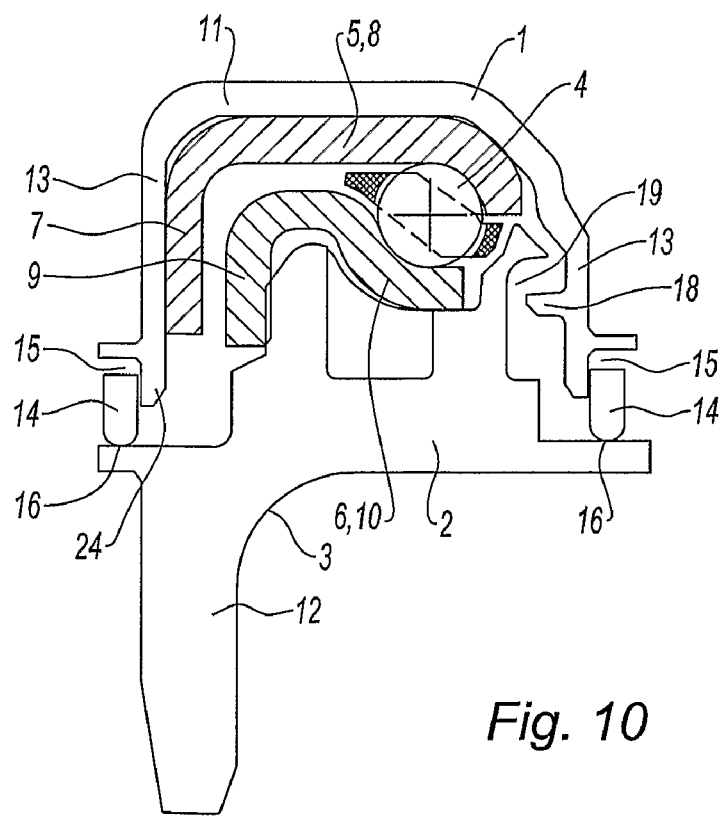

In the embodiments shown in FIGS. 1 to 5 and 7 to 10, the cover 11 comprises an annular skirt 13 forming on each side of the support an annular space between said cover and said support. In FIGS. 1 to 5 and 7, the stop comprises two lateral annular spaces which are formed between the internal and external diameters of the cover 11 and the support 12, wherein said annular spaces have a clearance so as to allow the rotation of the support 12 with respect to the cover 11 without there being any interference between them. In FIGS. 8 to 10, the annular spaces are axial as they are formed in an axial clearance that is formed between the support 12 and the end of the skirt 13.

The suspension stop further comprises a sealing element 14 that is positioned in the annular space, especially in each of the annular spaces, so that it is in friction contact with each of the cups 1, 2, wherein said sealing element is mounted so that it is mobile with respect to at least one cup 1, 2.

Consequently, the embodiment according to the invention permits the sealing function induced by the friction contact to be combined with the torque limitation induced by the possibility of moving said sealing element with respect to at least one cup 1, 2. In particular, in the case of deformation of the stop, especially of the cover 11 relatively to the support 12, a reduction in the clearance formed in the annular space does not lead to an increase in the torque induced by the friction of the sealing element 14. Furthermore, the stop according to the invention permits a rotation torque to be obtained that is substantially constant and therefore controllable precisely over an extended operating range, especially in relation to the mechanical solicitations that the suspension stop has to undergo in use.

In FIGS. 1 to 5, the annular spaces each have a radial annular groove 15 that is formed in the support 12, respectively on the internal diameter and on the external diameter of said support, so as to seal the two sides of the suspension stop. The sealing element 14 is fitted so that it is mobile in the groove 15 and, opposite said groove, is in friction contact with the cover 11. Consequently, the groove 15 permits the sealing element to be guided when it moves, whilst ensuring an impervious friction contact of said element on the support 12 and on the cover 11.

Figure 6:
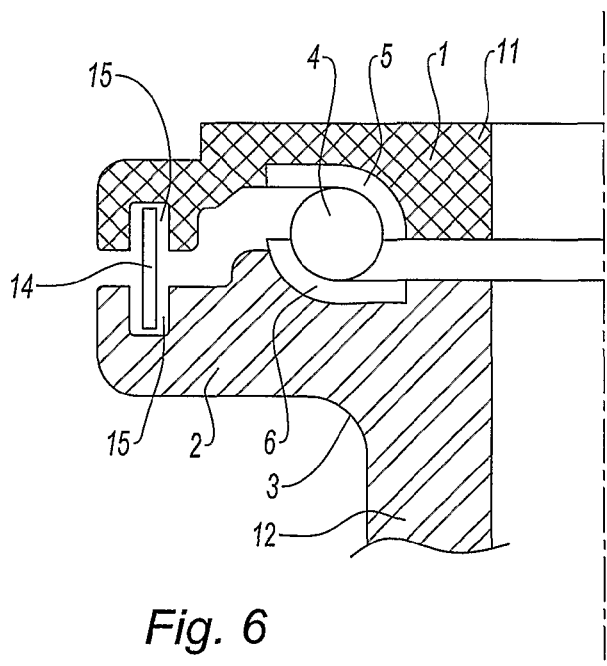

In the embodiment of FIG. 7, the annular space has an axial annular groove 15 that is formed in the support 12. In the embodiment of FIGS. 8 to 10, an axial annular groove 15 is formed in the cover 11 and, in the embodiment of FIG. 6, an axial annular groove 15 is respectively formed in the support 12 and the cover 11.

The sealing element 14 has an annular geometry that may be made in one piece, for example by moulding, or said element may have a cut-out so that it may be placed in the groove 15, wherein said element is then closed inside said groove at the level of the cut-out, especially by clipping or gluing.

In FIGS. 1 to 5 and 7 to 10, each annular space is defined by a portion 16 formed on the internal surface of the skirt 13 (FIGS. 1 to 5 and 7) or on the upper surface of the support 12 (FIGS. 8 to 10), wherein the sealing element 14 is in friction contact with said portion. Furthermore, the sealing element 14 is mounted so that it is mobile in the groove 15 according to a direction that is normal to said portion. Consequently, in the case of relative movement of the cover 11 and the support 12, the portion 16 induces an effort to move the sealing element 14 in the groove 15 that is optimised to limit the resulting torque.

In FIGS. 1 and 3 to 5, the grooves 15 extend radially and the portions 16 extend axially. In this embodiment, a radial clearance is formed between the diameters of the sealing element 14 and the groove 15 so as to permit a radial movement of said sealing element inside said groove. Furthermore, the sealing element 14 has a cross section that is substantially analogous to that of the groove 15, which is to say rectangular in the figure.

According to one variant, a clearance may be formed between the external periphery of the sealing element 14 and the internal periphery of the groove 15. According to another variant, a sliding friction contact may be formed between the groove 15 and the part of the sealing element 14 that is located inside.

Figure 3:
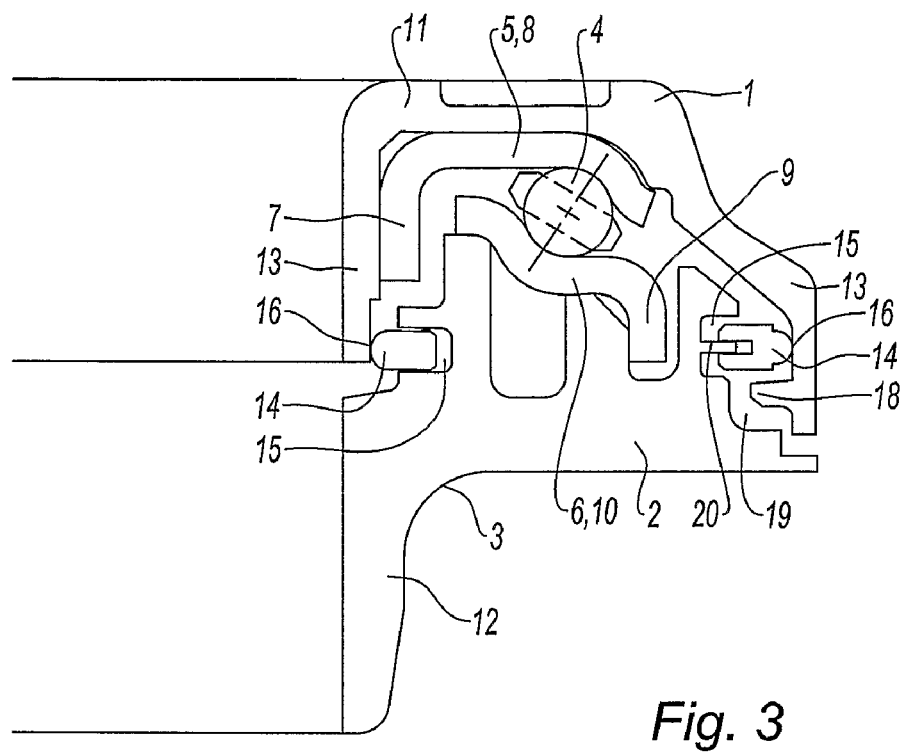

In FIG. 3, the inside of the external groove 15 has an annular crest 20, wherein the base of the sealing element 14 comprises an annular recess that engages with said crest to improve the radial guiding of said sealing element in said groove.

Figure 4:
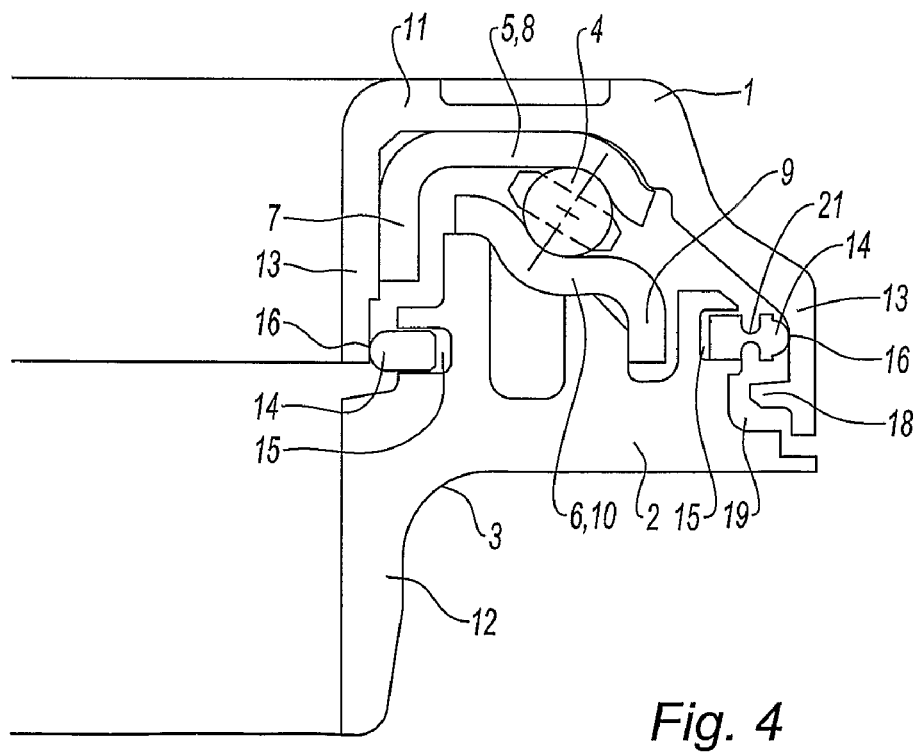

In FIG. 4, the sealing element 14 features a zone which facilitates its deformation by pressure from the portion 16 on its contact end. More precisely, the sealing element 14 has:
  an end with a rounded form to improve the friction contact with the portion 16;
  a rectangular base that engages with the groove 15 which has analogous geometry; and
  a bridge of material 21 connecting said end to said base, wherein said bridge has a reduced cross section to permit the buckling and translation of said end with respect to said base.

Figure 5:
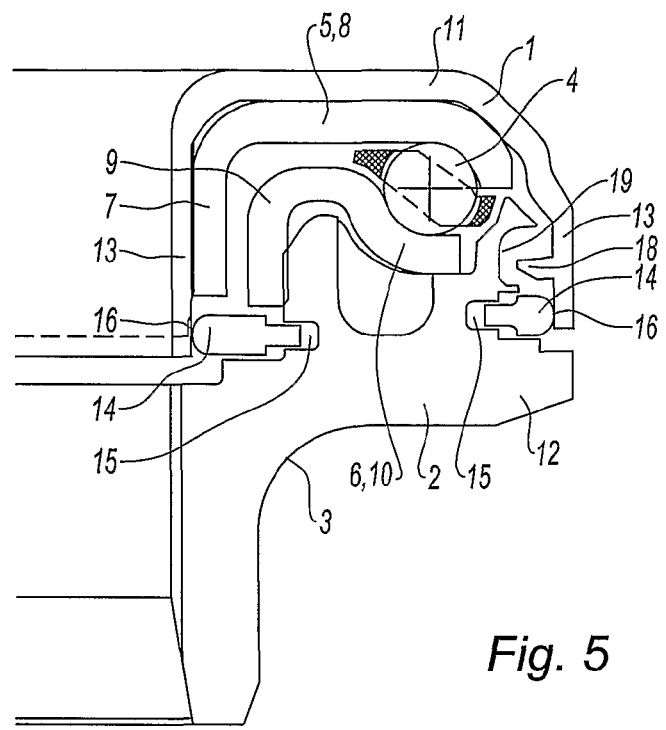

In FIG. 5, the external groove 15 has two levels which are created to permit the radial sliding respectively of one part of the sealing element 14. More precisely, the sealing element 14 has a base that is thinner than its end, wherein the internal part of said end is housed in the external level of the groove 15. Furthermore, in FIG. 5, the internal sealing element 14 also has this geometry, wherein the base is housed in the groove 15 and the external part of the end is guided by contact with a radial portion of the support 12.

In the embodiment according to FIGS. 1 and 3 to 10, the sealing element 14 may be made from an elastomer type material, for example natural rubber, polyurethane, thermoplastic elastomer material (TPE), or from a rigid thermoplastic material, for example polyethylene, polypropylene, polyamide 6, 6.6, 11 or 12. In these embodiments, the part of the sealing element 14 that is in friction contact with the portion 16 may be fitted with at least one flexible sealing lip, for example created by moulding onto a sealing element made from a thermoplastic material, or have a geometry which improves the friction contact, for example with a rounded end.

In the case where the sealing element 14 is rigid and the groove 15 is radial, the cover 11 may be mounted in force onto the support 12 in the groove 15 of which said sealing element is located, wherein said element is brought into friction contact with said cover when assembled. As a variant, to facilitate assembly, a chamfer may be added to the free edge of the skirt 13 and/or a rounded end on the sealing element 14.

In the case where the sealing element 14 is flexible, it is possible to provide for the use of a linear element, for example made by extrusion, that is cut-out and placed in the groove 15 before being closed inside said groove, for example by gluing. Moreover, still in this embodiment, the sealing element 14 may be strengthened by using a rigid armature onto which the flexible material is fitted, for example moulded onto it.

Figure 2:
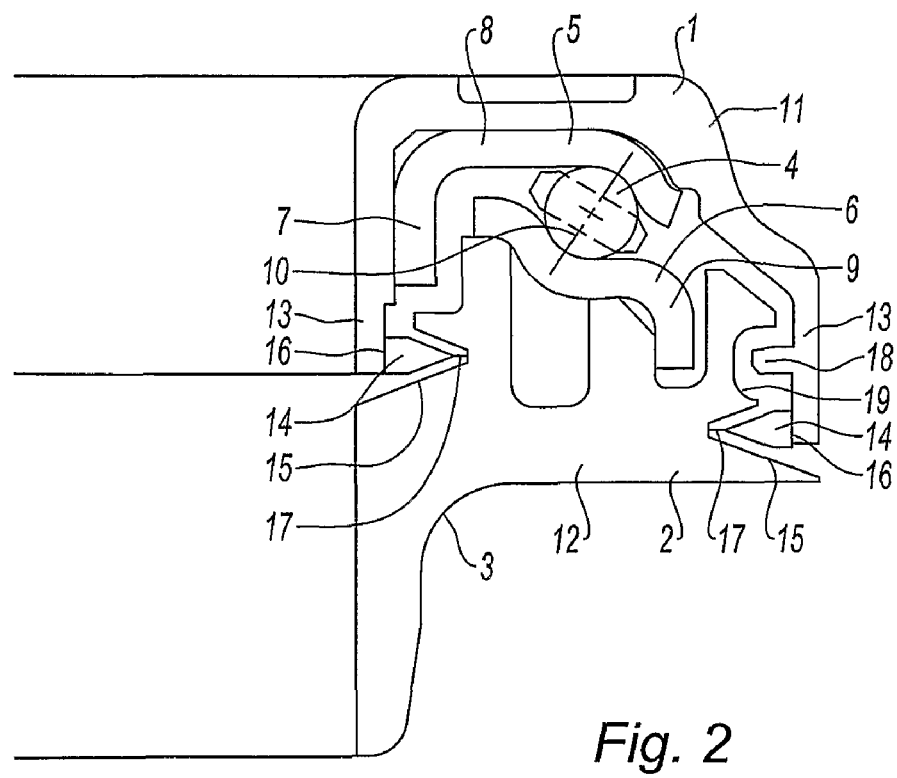

In FIG. 2, the sealing element 14 is made from a thermoplastic material and is moulded in one piece with the support 12, wherein said sealing element is associated to said support by a bridge of breakable material 17 so that, once broken, it is mobile with respect to said support. In particular, the material bridge 17 may be broken when assembling the cover 11 onto the support 12.

Furthermore, in this embodiment, the sealing element and the groove 15 have a divergent prismatic cross section so as to form an axial-radial clearance to permit said sealing element to pivot in said groove in the case of the cover 11 moving with respect to the support 12.

In the embodiments shown in FIGS. 1 to 5 and 7 to 10, the part of the skirt 13 which defines the external annular space has crests 18, wherein the support 12 has a cavity 19 inside which said crests are located without interference so as to form a hook to hold the cover 11 onto the support 12.

In FIG. 6, the external annular space has two axial annular grooves 15 which are respectively formed on the cover 11 and the support 12, wherein said grooves are axially opposite one another so as to form a housing inside which the sealing element 14 is fitted. More precisely, the sealing element 14 is formed by a strip folded into a ring (FIG. 6a), wherein the upper and lower edges of said strip are respectively guided in a groove 15 so as to provide the mobile assembly and friction contact of said sealing element with respect to the cover 11 and the support 12. To achieve this, an axial clearance is formed between the axial dimension of the sealing element 14 and that of the housing formed between the grooves 15, so as to allow an axial movement of said sealing element in said housing.

Figure 6A:
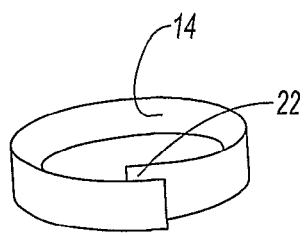
FIG. 6a shows in a perspective view the folded sealing element of the embodiment according to FIG. 6.

Furthermore, as shown in FIG. 6a, the strip may be folded with an overlap 22 so that, under the effect of the elastic return of the strip to the flat position, it permits the edges of the strip to be pressed radially respectively into a groove 15 and therefore apply pressure to the friction contact of said strip in the grooves 15.

Furthermore, as in the other embodiments described, the grooves 15 may contain a viscous substance to improve the imperviousness of the element 14. In particular, the substance may also have a lubricating function for the movements of the sealing element 14 in the groove 15.

In FIG. 7, the sealing element 14 has an axial base and a radial end in friction contact with the portion 16. Moreover, the axial groove 15 is laid out so as to permit axial and radial mobility of the sealing element 14 in function of the pressure exerted by the portion 16 on the end of said sealing element. To achieve this, the sealing element 14 is mounted in the groove 15 with a radial clearance between these diameters and said groove, as well as with an axial clearance between its axial dimension and that of said groove.

As in FIG. 7, FIGS. 8 to 10 describe an embodiment in which the grooves 15 are axial, which especially has the advantage of making the manufacturing easier by moulding.

In FIGS. 8 to 10, the grooves 15 extend axially and the portions 16 extend radially. In this embodiment, an axial clearance is formed between the axial dimension of the sealing element 14 and that of the groove 15 so as to permit an axial movement of said sealing element inside said groove.

Furthermore, the axial groove 15 is formed on the lower end of the cover 11, wherein the friction contact zone of the end of the sealing element 14 is formed on an upper radial portion 16 of the support 12. Moreover, the radial portion 16 is formed opposite the groove 15 with an axial clearance that is sufficient to ensure the friction contact and the mobility of the sealing element 14 inside said groove.

In FIG. 8, the groove 15 is defined radially on either side by an axial annular portion 23, 24, wherein the distance between said portions is sufficient to permit the mobility of the base of the sealing element 14 inside the groove 15. In FIG. 9, only the external axial annular portion 23 is present, wherein the sealing element 14 is guided by friction contact with the external face of the base of said element. In FIG. 10, only the internal axial annular portion 24 is present, wherein the sealing element 14 is guided by friction contact with the internal face of the base of said element. Moreover, in these two variants, the radial back wall of the groove 15 is conserved.

The invention claimed is:

1. Suspension stop for an automobile, wherein said stop comprises an upper cup, a lower cup and rolling bodies positioned between said upper and lower cups to permit the upper and lower cups to rotate relatively,
    wherein said upper and lower cups are fitted so that at least an annular space is provided between the upper and lower cups,
    wherein said stop further comprises a sealing element that is located in said annular space so that said sealing element is in friction contact with each of the upper and lower cups, and said sealing element is mounted so that said sealing element is mobile with respect to at least one of the upper and lower cups,
    wherein the upper cup comprises a cover associated to an upper washer having a lower bearing ring for the rolling bodies,
    wherein the lower cup comprises a support associated underneath a lower washer having an upper bearing ring for the rolling bodies,
    wherein the annular space is positioned between said cover and said support,
    wherein the annular space has at least one annular groove formed in said support,
    wherein the sealing element is fitted so that said sealing element is mobile inside said at least one annular groove and, opposite said at least one annular groove, is in friction contact with the cover,
    wherein the annular space is defined by a portion of the cover with which the sealing element is in friction contact, and
    wherein said sealing element is mounted so that said sealing element is mobile in the at least one annular groove according to a direction that is normal to said portion.

2. Suspension stop according to claim 1, wherein the at least one annular groove extends radially, wherein a radial clearance is formed between diameters of the sealing element and the at least one annular groove, so as to permit a radial movement of said sealing element inside said at least one annular groove.

3. Suspension stop according to claim 1, wherein the at least one annular groove extends axially, and
    wherein an axial clearance is formed between an axial dimension of the sealing element and that of the at least one annular groove, so as to permit an axial movement of said sealing element inside said at least one annular groove.

4. Suspension stop according to claim 1, wherein a clearance is formed between an external periphery of the sealing element and internal periphery of the at least one annular groove.

5. Suspension stop according to claim 4, wherein the clearance is axial-radial, so as to permit the sealing element to pivot in the at least one annular groove.

6. Suspension stop for an automobile,
    wherein said stop comprises an upper cup, a lower cup and rolling bodies positioned between said upper and lower cups to permit the upper and lower cups to rotate relatively,
    wherein said upper and lower cups are fitted so that at least an annular space is provided between the upper and lower cups,
    wherein said stop further comprises a sealing element that is located in said annular space so that said sealing element is in friction contact with each of the upper and lower cups, and said sealing element is mounted so that said sealing element is mobile with respect to at least one of the upper and lower cups, wherein the upper cup comprises a cover associated to an upper washer having a lower bearing ring for the rolling bodies, wherein the lower cup comprises a support associated underneath a lower washer having an upper bearing ring for the rolling bodies, wherein the annular space is positioned between said cover and said support, and said suspension stop further comprising:

two lateral annular spaces formed between internal and external diameters of the cover and the support, wherein the sealing element is positioned in each of the annular spaces, so that the sealing element is in friction contact with each of the upper and lower cups and is mounted so that the sealing element is mobile with respect to at least one of the cups.

7. Suspension stop according to claim 1, wherein the sealing element is made from an elastomer type material.

8. Suspension stop according to claim 1, wherein the sealing element is made from a rigid thermoplastic material.

9. Suspension stop according to claim 8, wherein the sealing element is molded with the support, and wherein said sealing element is associated to said support by a bridge of breakable material so that, once broken, said sealing element is mobile with respect to said support.

10. Suspension stop according to claim 6, wherein the cover comprises an annular skirt forming on each side of the support an annular space, and wherein a chamfer is added to a free edge of the skirt and/or a rounded end on the sealing element.

* * * * *